United States Patent
Han et al.

(10) Patent No.: US 11,755,097 B2
(45) Date of Patent: Sep. 12, 2023

(54) METHOD FOR MODELING POWER CONSUMPTION OF AN INTEGRATED CIRCUIT AND POWER CONSUMPTION MODELING SYSTEM PERFORMING THE SAME

(71) Applicant: Baum Design Systems Co., Ltd., Seoul (KR)

(72) Inventors: In Hak Han, Daejeon (KR); Jin Hyeong Park, Seoul (KR)

(73) Assignee: Baum Design Systems Co., Ltd., Seoul (KR)

( * ) Notice: Subject to any disclaimer, the term of this patent is extended or adjusted under 35 U.S.C. 154(b) by 0 days.

(21) Appl. No.: 17/849,707

(22) Filed: Jun. 27, 2022

(65) Prior Publication Data
US 2023/0010159 A1    Jan. 12, 2023

(30) Foreign Application Priority Data
Jul. 12, 2021    (KR) .................. 10-2021-0091077

(51) Int. Cl.
*G06F 30/396* (2020.01)
*G06F 119/06* (2020.01)
*G06F 1/3237* (2019.01)
*G06F 30/327* (2020.01)

(52) U.S. Cl.
CPC .......... *G06F 1/3237* (2013.01); *G06F 30/327* (2020.01); *G06F 30/396* (2020.01); *G06F 2119/06* (2020.01)

(58) Field of Classification Search
CPC .... G06F 1/3237; G06F 30/327; G06F 30/396; G06F 2119/06; G06F 2117/04; G06F 2119/00; Y02D 10/00

USPC ................... 703/2, 14–18; 716/109
See application file for complete search history.

(56) References Cited

U.S. PATENT DOCUMENTS

| | | | | |
|---|---|---|---|---|
| 2008/0127001 A1* | 5/2008 | Tamaki | ............ | G06F 30/367 716/108 |
| 2013/0151228 A1* | 6/2013 | Yi | ............ | G06F 1/3237 703/18 |

FOREIGN PATENT DOCUMENTS

| | | | | |
|---|---|---|---|---|
| JP | 2008-134824 A | 6/2008 | | |
| KR | 10-2011-0113551 A | 10/2011 | | |
| KR | 10-2016-0038532 A | 4/2016 | | |
| KR | 20160038532 | * 4/2016 | ............ | G01R 31/28 |

* cited by examiner

*Primary Examiner* — Juan C Ochoa
(74) *Attorney, Agent, or Firm* — Nicholas Park

(57) ABSTRACT

Example embodiments relate to a method for modeling power consumption of an integrated circuit, the method may comprise, determining, by the processor, a hierarchy structure regarding a gating level according to a clock flow of a plurality of clock gating cells included in the integrated circuit, determining, by the processor, a first clock gating domain corresponding to a first clock gating cell and a second clock gating domain corresponding to a second clock gating cell located in a lower level of the hierarchy of the first clock gating cell based on the hierarchy structure, calculating, by the processor, power consumption of the second clock gating domain based on a first logic level of a first clock gating enable signal applied to the first clock gating cell, and modeling, by the processor, power consumption of the integrated circuit based on the power consumption of the second clock gating domain.

7 Claims, 12 Drawing Sheets

METHOD FOR MODELING POWER CONSUMPTION OF AN INTEGRATED CIRCUIT AND POWER CONSUMPTION MODELING SYSTEM PERFORMING THE SAME

CROSS-REFERENCE TO RELATED APPLICATION

This application claims the benefit of priority from Korean Patent Application No. 10-2021-0091077, filed on Jul. 12, 2021, in the Korean Intellectual Property Office, the disclosure of which is incorporated herein in its entirety by reference.

BACKGROUND

Technical Field

Present invention relates to a method for modeling power consumption for an integrated circuit and a power consumption modeling system for performing the same.

Description of the Related Art

An integrated circuit refers to an electronic device in which various functions such as operation and storage are integrated in one semiconductor chip. As technology is advanced, various types of mobile devices are being developed. Mobile devices pursue miniaturization and weight reduction by providing an integrated circuit device. A disadvantage of mobile devices is that they have a limited power source, such as a battery. To extend the operating life of mobile devices, research is being conducted on increasing the capacity of the battery and reducing the power of the integrated circuit device.

Modeling the power consumption of an integrated circuit device is a prerequisite for achieving low power consumption of the integrated circuit device. The conventional method for modeling power consumption has a problem in that it consumes too long modeling time or has low accuracy.

Various methods have been proposed to solve this problem, but the proposed methods are generating a power model by a person who understands the operation of the target integrated circuit device based on a significant state from the power consumption point of view as a power state. However, these methods have a problem in that there is a large displacement depending on the knowledge and experience of the person performing it, and there is a problem in that it is difficult to automate.

SUMMARY

The present disclosure relates to provide a method for modeling power consumption for an integrated circuit that calculates power consumption for each domain in consideration of the hierarchy structure and a power consumption modeling system that performs the same. The present disclosure also relates to provide an integrated circuit method for modeling power consumption for calculating power consumption for each domain in consideration of the presence or absence of memory and a power consumption modeling system for performing the same.

In an embodiment, a method for modeling power consumption for an integrated circuit, performed by a power consumption modeling system including a processor based on a computer program including at least one instruction, the method may comprise determining, by the processor, a hierarchy structure regarding a gating level according to a clock flow of a plurality of clock gating cells included in the integrated circuit, determining, by the processor, a first clock gating domain corresponding to a first clock gating cell and a second clock gating domain corresponding to a second clock gating cell located in a lower level of the hierarchy of the first clock gating cell based on the hierarchy structure, calculating, by the processor, power consumption of the second clock gating domain based on a first logic level of a first clock gating enable signal applied to the first clock gating cell, modeling, by the processor, power consumption of the integrated circuit based on the power consumption of the second clock gating domain and generating, by the processor, a power consumption modeling circuit using the modeled power consumption of the integrated circuit.

In an embodiment, the calculating, by the processor, power consumption of the second clock gating domain based on a first logic level of a first clock gating enable signal applied to the first clock gating cell may comprise determining, by the processor, a first logic level of the first clock gating enable signal and a second logic level of a second clock gating enable signal applied to the second clock gating cell and calculating, by the processor, power consumption of the second clock gating domain by multiplying the first logic level, the second logic level, and a second weight corresponding to the second clock gating domain.

In an embodiment, the calculating, by the processor, power consumption of the second clock gating domain based on a first logic level of a first clock gating enable signal applied to the first clock gating cell may comprise calculating, by the processor, power consumption of the first clock gating domain by multiplying the first logic level and a first weight corresponding to the first clock gating domain, and wherein the modeling, by the processor, power consumption of the integrated circuit based on the power consumption of the second clock gating domain may comprise modeling, by the processor, power consumption of the integrated circuit based on the power consumption of the first clock gating domain and power consumption of the second clock gating domain.

In an embodiment, the calculating, by the processor, power consumption of the second clock gating domain based on a first logic level of a first clock gating enable signal applied to the first clock gating cell may comprise determining, by the processor, whether a memory is included in a third clock gating domain corresponding to a third clock gating cell, determining, by the processor, a third weight corresponding to the third clock gating domain based on the operating state of the memory if the memory is included in the third clock gating domain and calculating, by the processor, power consumption for the third clock gating domain based on the third weight and a third logic level of a third clock gating enable signal applied to the third clock gating cell.

In an embodiment, the determining, by the processor, a third weight corresponding to the third clock gating domain based on the operating state of the memory if the memory is included in the third clock gating domain may comprise obtaining, by the processor, information of at least one signal applied to the memory and determining, by the processor, the third weight corresponding to the combination of the at least one signal based on a weight look up table.

In an embodiment, the at least one signal applied to the memory includes a chip enable signal and a write enable signal, and wherein the weight look up table includes information on weights for each combination of the chip enable signal and the write enable signal.

In an embodiment, the third clock gating domain includes a first memory and a second memory, and wherein the calculating, by the processor, power consumption for the third clock gating domain based on the third weight and a third logic level of a third clock gating enable signal applied to the third clock gating cell may comprise obtaining, by the processor, a first sub-weight from the weight look up table based on a combination of first signals applied to the first memory in a first clock cycle, obtaining, by the processor, a second sub-weight from the weight look up table based on a combination of second signals applied to second memory in the first clock cycle, calculating, by the processor, the third weight corresponding to the third clock gating domain of the first clock cycle by summing the first sub-weight and the second sub-weight, calculating, by the processor, power consumption corresponding to the third clock gating domain of the first clock cycle based on the third weight, obtaining, by the processor, a third sub-weight from the weight look up table based on a combination of third signals applied to the first memory in a second clock cycle, obtaining, by the processor, a fourth sub-weight from the weight look up table based on a combination of fourth signals applied to second memory in the second clock cycle, calculating, by the processor, a fourth weight corresponding to the third clock gating domain of the second clock cycle by summing the third sub-weight and the fourth sub-weight and calculating, by the processor, power consumption corresponding to the third clock gating domain of the second clock cycle based on the fourth weight.

In an embodiment, the method may further comprise Identifying, by the processor, an independent element not included in any of clock gating domains of the plurality of clock gating cells, measuring, by the processor, power consumption for a combinational logic among the independent elements, determining, by the processor, a first constant corresponding to the power consumption for the combinational logic, determining, by the processor, a second constant for at least one clock logic to which the clock is applied among the independent elements and modeling, by the processor, power consumption of the integrated circuit based on the first constant and the second constant.

In an embodiment, a method for modeling power consumption for an integrated circuit, performed by a power consumption modeling system including a processor based on a computer program including at least one instruction, the method may comprise determining, by the processor, whether a memory is included in a clock gating domain corresponding to a clock gating cell, determining, by the processor, a first weight corresponding to the clock gating domain based on the operating state of the memory if the memory is included in the clock gating domain, calculating, by the processor, power consumption for the clock gating domain based on the first weight and a first logic level of a clock gating enable signal applied to the clock gating cell and generating, by the processor, a power consumption modeling circuit using the calculated power consumption of the integrated circuit.

In an embodiment, the determining, by the processor, the first weight corresponding to the clock gating domain based on the operating state of the memory if the memory is included in the clock gating domain may comprise obtaining, by the processor, information of at least one signal applied to the memory and determining, by the processor, the first weight corresponding to the combination of the at least one signal based on a weight look up table.

In an embodiment, the at least one signal applied to the memory may include a chip enable signal and a write enable signal, and the weight look up table may include information on weights for each combination of the chip enable signal and the write enable signal.

In an embodiment, the clock gating domain includes a first memory and a second memory, and wherein the calculating, by the processor, power consumption for the clock gating domain based on the first weight and a first logic level of the clock gating enable signal applied to the clock gating cell may comprise obtaining, by the processor, a first sub-weight from the weight look up table based on a combination of first signals applied to the first memory in a first clock cycle, obtaining, by the processor, a second sub-weight from the weight look up table based on a combination of second signals applied to second memory in the first clock cycle, calculating, by the processor, the first weight corresponding to the clock gating domain of the first clock cycle by summing the first sub-weight and the second sub-weight, calculating, by the processor, power consumption corresponding to the clock gating domain of the first clock cycle based on the first weight, obtaining, by the processor, a third sub-weight from the weight look up table based on a combination of third signals applied to the first memory in a second clock cycle, obtaining, by the processor, a fourth sub-weight from the weight look up table based on a combination of fourth signals applied to second memory in the second clock cycle, calculating, by the processor, a second weight corresponding to the clock gating domain of the second clock cycle by summing the third sub-weight and the fourth sub-weight and calculating, by the processor, power consumption corresponding to the clock gating domain of the second clock cycle based on the second weight.

In an embodiment, a programmed computing system for executing a computer program providing a method for designing an integrated circuit, the programmed computing system may comprise an input/output device configured to receive the specifications of a designed circuit and displays a power consumption modeling circuit corresponding to the designed circuit, a memory device configured to store the computer program and a processor configured to perform the method for designing the integrated circuit by accessing the memory device, wherein the processor, based on the computer program, is configured to determine, by the processor, whether a memory is included in a clock gating domain corresponding to a clock gating cell in the received designed circuit, determine, by the processor, a first weight corresponding to the clock gating domain based on the operating state of the memory if the memory is included in the clock gating domain, calculate, by the processor, power consumption for the clock gating domain based on the first weight and a first logic level of a clock gating enable signal applied to the clock gating cell and generate, by the processor, the power consumption modeling circuit using the calculated power consumption of the integrated circuit.

According to an aspect of the present disclosure, predicted power consumption similar to actual power consumption may be modeled by calculating power consumption for each domain in consideration of the hierarchy structure. According to an aspect of the present disclosure, it is possible to calculate the power consumption according to the operating state of the memory by calculating the power consumption for each domain based on the presence of memory, and thus it is possible to model power consumption similar to actual power consumption.

DETAILED DESCRIPTION

Figure 1:
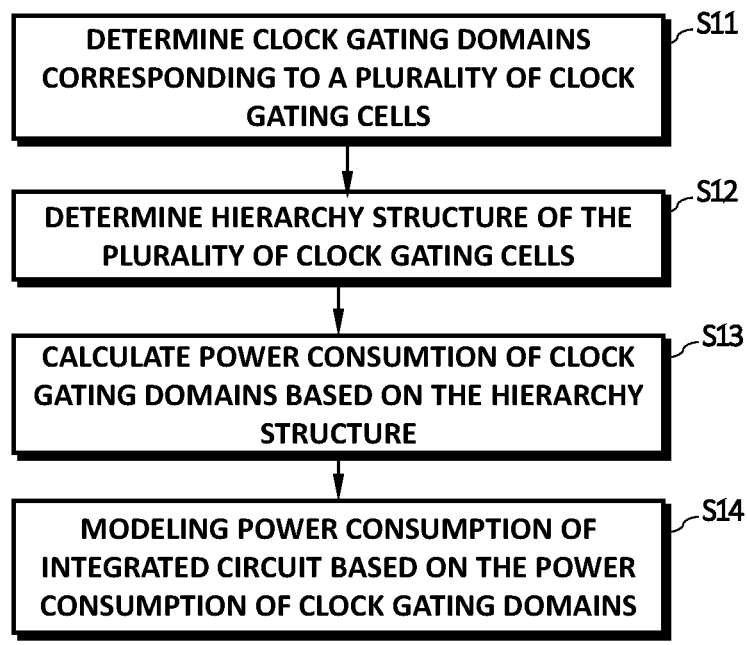
FIG. 1 is a flowchart illustrating a method for modeling power consumption for an integrated circuit according to an exemplary embodiment of the present disclosure.

Hereinafter, preferred embodiments of the present disclosure will be described in detail with reference to the accompanying drawings. Advantages and features of the present disclosure, and methods of achieving them will become apparent with reference to the embodiments described below in detail in conjunction with the accompanying drawings. However, the technical idea of the present disclosure is not limited to the following embodiments, but may be implemented in various different forms, and only the following embodiments complete the technical idea of the present disclosure, and in the technical field to which the present disclosure belongs It is provided to fully inform those of ordinary skill in the scope of the present disclosure, and the technical idea of the present disclosure is only defined by the scope of the claims.

In adding reference numerals to the components of each drawing, it should be noted that the same components are given the same reference numerals as much as possible even though they are indicated on different drawings. In addition, in describing the present disclosure, if it is determined that a detailed description of a related known configuration or function may obscure the gist of the present disclosure, the detailed description thereof will be omitted.

Unless otherwise defined, all terms (including technical and scientific terms) used herein may be used with the meaning commonly understood by those of ordinary skill in the art to which this disclosure belongs. In addition, terms defined in a commonly used dictionary are not to be interpreted ideally or excessively unless clearly specifically defined. The terminology used herein is for the purpose of describing the embodiments and is not intended to limit the present disclosure. In this specification, the singular also includes the plural unless otherwise specified in the phrase.

In addition, in describing the components of the present disclosure, terms such as first, second, A, B, (a), (b), etc. may be used. These terms are only for distinguishing the component from other components, and the essence, order, or order of the component is not limited by the term. When it is described that a component is "connected", "coupled" or "connected" to another component, the component may be directly connected or connected to the other component, but it should be also understood but another component may be "connected," "coupled," or "connected" between each component.

As used herein, "comprises" and/or "comprising" may not exclude one or more other components, steps, operations and/or elements besides referenced component, step, operation and/or element.

A component included in an embodiment and a component having a common function may be described using the same name in another embodiment. Unless otherwise stated, the descriptions in any an embodiment may be applied to other embodiments, and specific descriptions will be omitted within the overlapping range or within the range that can be clearly understood by those skilled in the art.

Hereinafter, the present disclosure will be described in detail with reference to preferred embodiments of the present disclosure and the accompanying drawings.

FIG. 1 is a flowchart illustrating a method for modeling power consumption for an integrated circuit according to an exemplary embodiment of the present disclosure.

According to FIG. 1, the method for modeling power consumption for the integrated circuit may comprise a domain determination step S11, a hierarchy structure determination step S12, a power consumption calculation step for each domain S13, and an integrated circuit power consumption modeling step S14. In an embodiment, the method for modeling power consumption may be performed based on a gate level, a register transfer level, or a system level.

The method for modeling power consumption may be performed by a power consumption modeling system. The power consumption modeling system may include various configurations used to design an integrated circuit. The power consumption modeling system may be implemented by various terminal devices, such as cellular phone, smart phone, laptop, Personal Computer (PC), navigation, Personal Communication System (PCS), Global System for Mobile communications (GSM), Personal Digital Cellular (PDC), Personal Handy-phone System (PHS), Personal Digital Assistant (PDA), International Mobile Telecommunication (IMT)-2000, Code Division Multiple Access (CDMA)-2000, W-CDMA. a Wireless Broadband Internet (Wi-bro) terminal, a smart pad, and a tablet PC.

The integrated circuit may operate on a clock gating basis. The integrated circuit may be divided into a clock gating input cone and a clock gating domain centering on a clock gating cell. The clock gating input cone may be configured to control the clock gating enable signal in response to the input signal. For example, the clock gating input cone may be configured to control the clock gating enable signal to a logic low or logic high.

The clock gating cell is configured to stop and resume clock supply to the clock gating domain in response to the clock gating enable signal. For example, the clock gating cell may be configured to receive a clock and output the received clock to the clock gating domain in response to a clock gating enable signal.

The clock gating domain may be configured to operate in response to a gated clock that is an output of a clock gating cell, and for example, the clock gating domain may include a clock network connected to the gated clock.

When the clock gating cell stops outputting the gated clock, the clock gating domain may stop operating. For example, the clock gating domain may stop the operation while maintaining data in response to the stop of the gated clock that is the output of the clock gating cell. Accordingly, power consumption of the clock gating domain can be prevented.

In this specification, the clock gating domain may refer to a fan-out logic cone of a clock gating cell to which a clock gated by one clock gating cell is supplied.

In the domain determination step S11, the power consumption modeling system may extract clock gating domains corresponding to each of a plurality of clock gating cells included in the integrated circuit. As described above, the power consumption modeling system may extract elements to which a clock is applied based on one clock gating enable signal for each of a plurality of clock gating cells into the clock gating domain.

In the hierarchy structure determination step S12, the power consumption modeling system may determine the hierarchy structure of a plurality of clock gating cells. In this specification, the hierarchy structure of clock gating cells may refer to a signal gating level according to a clock flow. In one example, the clock gating cell located at the lower level of the hierarchy among the hierarchy structure may re-gate the clock gated by the clock gating cell located at the upper level of the hierarchy. The power consumption modeling system may determine the clock gating cell in the lower level of the hierarchy and the clock gating cell in the upper level of the hierarchy of the clock gating cell by detecting the hierarchy structure of a plurality of clock gating cells.

In the power consumption calculation step S13 for each domain, the power consumption modeling system may calculate the power consumption for each clock gating domain in consideration of the hierarchy structure. In one embodiment, the power consumption modeling system may calculate the power consumption of one clock gating domain, based on the clock gating enable signal of the clock gating cell and the clock gating enable signal applied to the clock gating cell of the upper level of the hierarchy. In one example, power consumption may be clock network power consumed by elements to which a clock is applied among elements included in the clock gating domain. In another example, the power consumption modeling system may model the power consumed by the combinational logic in addition to the clock network power.

In the integrated circuit power consumption modeling step S14, the power consumption modeling system may model the integrated circuit power consumption by using the power consumption for each clock gating domain. In an embodiment, the power consumption modeling system may model power consumption for an integrated circuit by adding power consumption for a plurality of clock gating domains. In addition, the power consumption modeling system may use the modeled power consumption to create a power consumption modeling circuit that calculates power consumption and uses the generated power consumption modeling circuit to calculate the actual power consumption instead of using a relatively complex actual circuit.

When calculating power consumption for each clock gating domain, the method for modeling power consumption according to the technical concept of the present disclosure may consider not only the clock gating enable signal corresponding to the clock gating domain but also the clock gating enable signal of the upper level of the hierarchy. In result, it is possible to calculate the precise power consumption.

Figure 2:
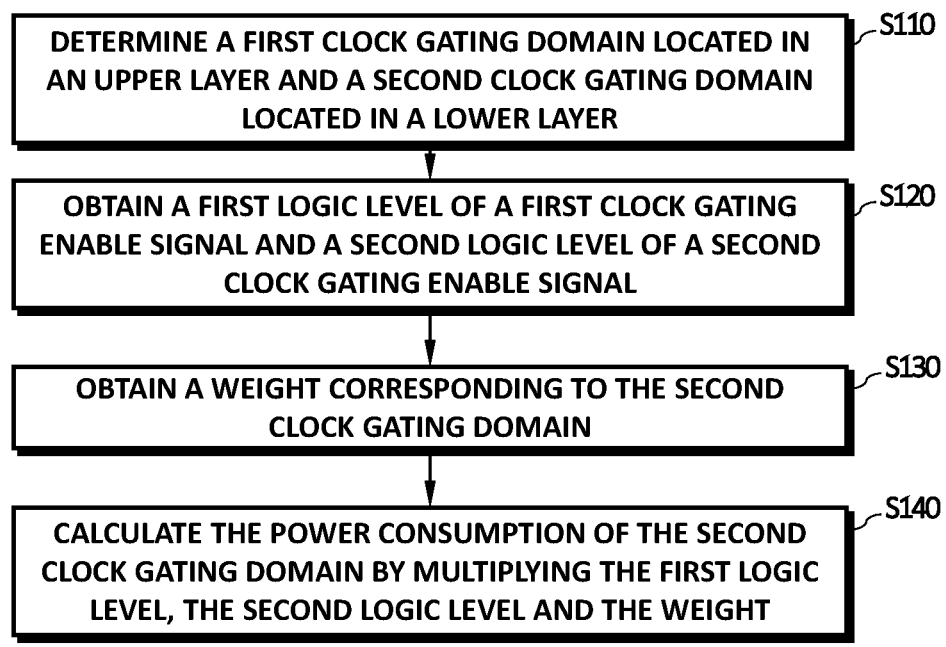
FIG. 2 is a flowchart illustrating a method for modeling power consumption for an integrated circuit according to an exemplary embodiment of the present disclosure.

FIG. 2 is a flowchart illustrating a method for modeling power consumption for an integrated circuit according to an exemplary embodiment of the present disclosure. In detail, FIG. 2 shows a method of calculating power consumption for the second clock gating domain in consideration of the hierarchy structure.

According to FIG. 2, the power consumption modeling system may determine a first clock gating domain located at an upper level of the hierarchy and a second clock gating domain located at a lower level of the hierarchy S110. In one example, the first clock gating domain may be provided with a clock gated by the first clock gating cell controlled by the first clock gating enable signal, and the second clock gating domain may be provided with clocks gated by both the first clock gating cell and the second clock gating cell controlled by the second clock gating enable signal. Accordingly, it may be expressed that the second clock gating domain is located at a lower level of the hierarchy compared to the first clock gating domain.

The power consumption modeling system may obtain information about the first logic level of the first clock gating enable signal and the second logic level of the second clock gating enable signal S120. In one example, each of the first logic level and the second logic level is '1 or logic high (H)' meaning outputting the clock to the clock gating domain, and '0 or logic low (L)' meaning not outputting the clock to the clock gating domain. In one example, the power consumption modeling system may determine the first logic level and the second logic level according to a scenario of operating the integrated circuit.

The power consumption modeling system may acquire a weight corresponding to the second clock gating domain S130. In this specification, weight may indicate a weighted constant for power consumption on a clock network that varies depending on the type and number of elements included in the clock gating domain.

The power consumption modeling system may calculate the power consumption of the second clock gating domain by multiplying the first logic level, the second logic level, and the determined weight S140. That is, the power consumption of the second clock gating domain may be calculated only when the first logic level as well as the second logic level is 'logic high'. If the power consumption of the second clock gating domain is calculated in consideration of only the second logic level, when the clock may be considered as being applied to the second clock gating domain even when the clock is not applied to the second clock gating domain by the first clock gating cell, so it may be calculated to be a value different from the actual power consumption value. On the other hand, according to an embodiment of the present invention, it is possible to calculate the dynamic power consumption for the case where the clock is actually applied to the clock gating domain in consideration of the hierarchy structure. Accordingly, when dynamic power is actually consumed as the clock is actually applied to the second clock gating domain, the actual power consumption is reflected, so that accurate power consumption may be calculated.

Figure 3:
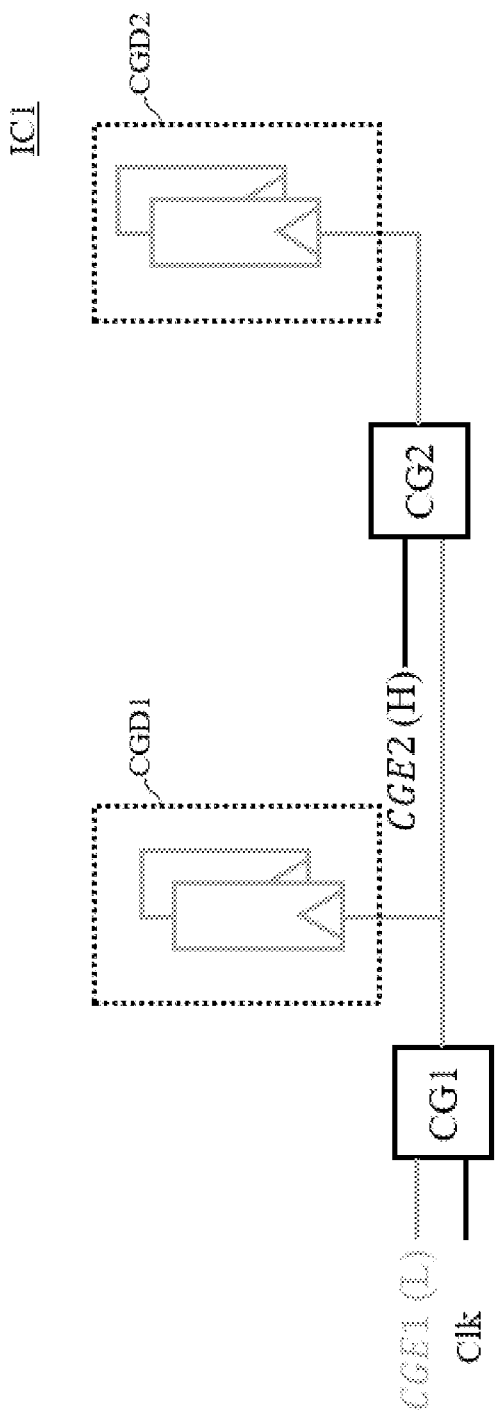
FIG. 3 is a circuit diagram illustrating an integrated circuit according to an exemplary embodiment of the present disclosure.

FIG. 3 is a circuit diagram illustrating an integrated circuit according to an exemplary embodiment of the present disclosure. In detail, FIG. 3 is a diagram for explaining a method of calculating power consumption for a clock gating domain based on a hierarchy structure.

According to FIG. 3, the integrated circuit IC1 may comprise the first clock gating cell CG1 controlled by the first clock gating enable signal CGE1, the first clock gating domain CGD1 received the clock Clk by the first clock gating cell CG1, the second clock gating cell CG2 controlled by the second clock gating enable signal CGE2 and the second clock gating domain CGD2 received the clock Clk by the second clock gating cell CG2.

The second clock gating cell CG2 may output the clock Clk gated by the first clock gating cell CG1 to the second clock gating domain CGD2. Therefore, it can be said that the second clock gating cell CG2 is located at a lower level of the hierarchy compared to the first clock gating cell CG1.

Since power consumption CP1 of the first clock gating domain CGD1 does not have a clock gating cell of the upper level of the hierarchy than first clock gating cell CG1, for the first weight Wt1 corresponding to the first clock gating domain CGD1, power consumption CP1 may be calculated as the product of the first weight Wt1 and the first clock gating enable signal CGE1 as in "CP1=Wt1*CGE1". In one example, power consumption CP1 may mean clock network power consumed in a element to which a clock is applied to the first clock gating domain CGD1.

On the other hand, since the second clock gating domain CGD2 has an upper level of the hierarchy of the second clock gating cell CG2, which is the first clock gating cell CG1, the power consumption CP2 of the second clock gating domain CGD2 may be calculated in consideration of the first clock gating enable signal CGE1 and the second clock gating enable signal CGE2, so for the second weight Wt2 corresponding to the second clock gating domain CGD2, the power consumption CP2 may be calculated as "CP2=Wt2*CGE1*CGE2".

Accordingly, power consumption CP for the integrated circuit IC1 may be calculated as in Equation 1 below. (C1 is a constant value due to leakage power, etc.)

$$CP=CP1+CP2+C1=Wt1*CGE1+Wt2*CGE1*CGE2+C1 \quad \text{[Equation 1]}$$

In the example of FIG. 3, when considering the upper level of the hierarchy, the first clock gating enable signal CGE1 is a logic low '0' and the second clock gating enable signal CGE2 is a logic high '1', power consumption CP for the integrated circuit IC1 may be calculated by reflecting the actual consumed power.

If the hierarchy structure is not considered, although the clock Clk is not transmitted to the second clock gating domain CGD2 by the first clock gating enable signal CGE1, power consumption CP can be calculated more than actual consumed power since the second clock gating enable signal CGE2 is logic high '1'. According to an embodiment of the present disclosure, the power consumption of the clock gating domain may be calculated based on whether the clock Clk is actually transmitted by considering the clock enable signal of the upper level of the hierarchy in consideration of the hierarchy structure, and thus accurate power consumption modeling is possible.

In FIGS. 1 to 3, only an example in which two layers of clock gating cells CG1, CG2 are included in the integrated circuit is shown, but this is only an example, even if the clock gating cell of more than two layers is included in the integrated circuit, in the embodiment of calculating the power consumption for the clock gating domain of the lower level of the hierarchy in consideration of the clock gating enable signal of the upper level of the hierarchy, the technical concept of the present disclosure may be applied.

Figure 4:
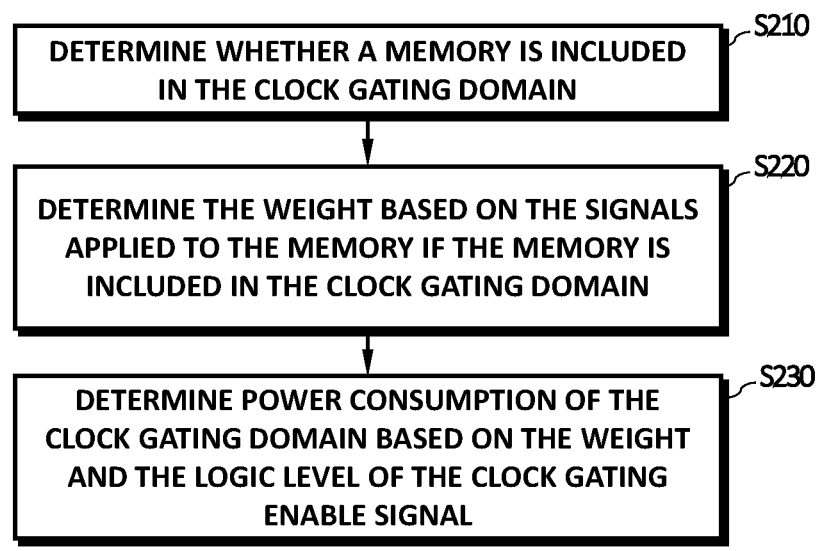
FIG. 4 is a flowchart illustrating a method for modeling power consumption for an integrated circuit according to an exemplary embodiment of the present disclosure.

FIG. 4 is a flowchart illustrating a method for modeling power consumption for an integrated circuit according to an exemplary embodiment of the present disclosure. In detail, FIG. 4 shows a method of modeling power consumption based on a memory operation state.

According to FIG. 4, the power consumption modeling system may determine whether a memory is included in the clock gating domain S210. In the present specification, a memory may refer to a device used to store data, and include non-volatile memories such as NAND, NOR, flash memory, and hard disk, and volatile memories such as DRAM and SRAM.

When the memory is included, the power consumption modeling system may determine a weight for calculating power consumption for the clock gating domain including the memory based on the memory operation state S220. In an embodiment, the power consumption modeling system may determine the weight based on various combinations of signals applied to the memory.

The power consumption modeling system may determine the power consumption for the clock gating domain based on the weight and the logic level of the clock gating enable signal S230.

According to an embodiment of the present disclosure, the power consumption modeling system may model the power consumption of an integrated circuit by determining a weight based on the operating state of the memory when the memory is included in the clock gating domain. In result, it may reflect the power consumption of the memory that is different for each operation state, and accordingly, the power consumption may be accurately modeled.

Figure 5:
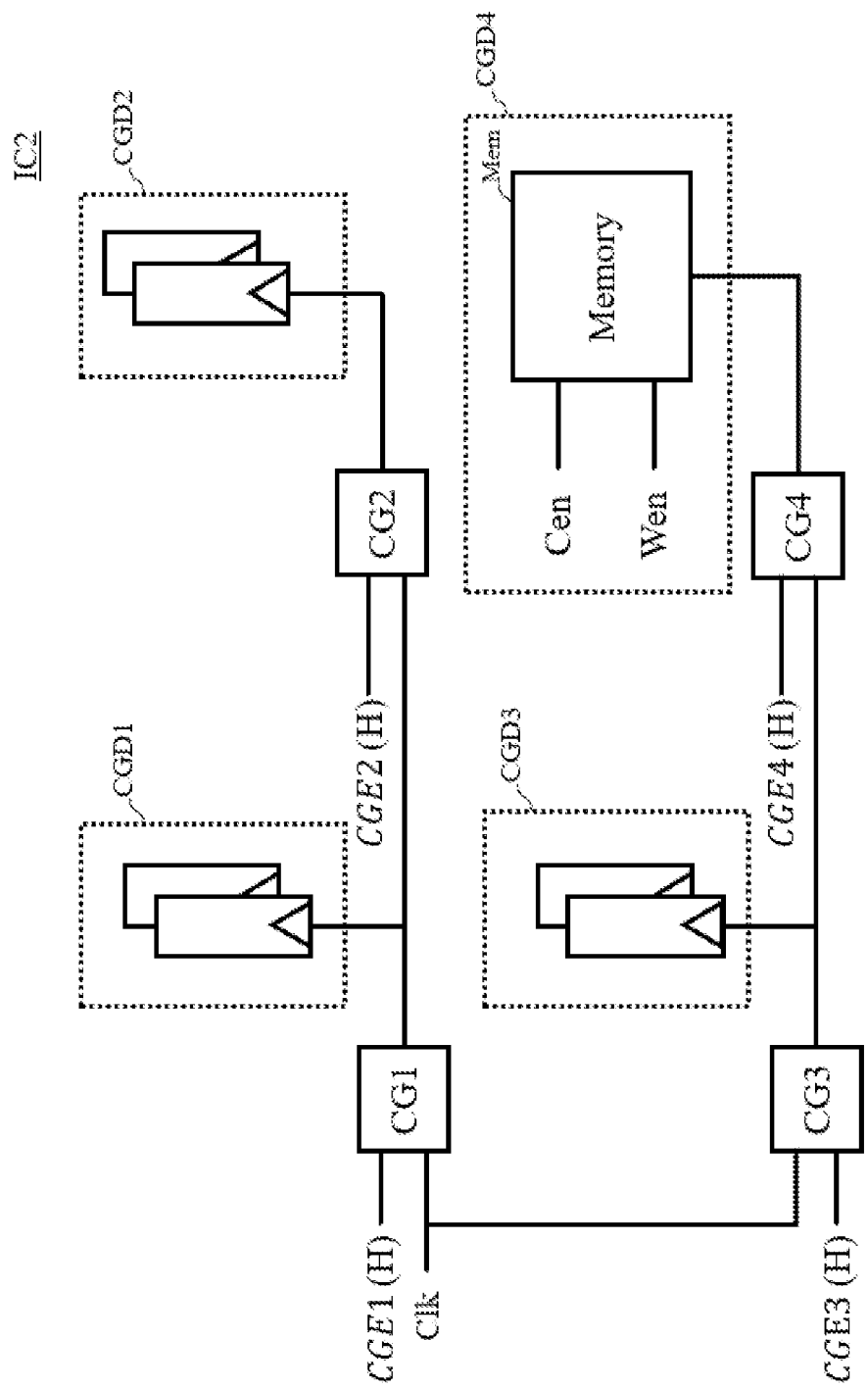
FIG. 5 is a circuit diagram illustrating an integrated circuit according to an exemplary embodiment of the present disclosure.

FIG. 5 is a circuit diagram illustrating an integrated circuit according to an exemplary embodiment of the present disclosure. In detail, FIG. 5 is a diagram for explaining a method of calculating power consumption for a clock gating domain based on a memory operation state.

According to FIG. 5, the integrated circuit IC2 may comprise the first clock gating cell CG1 controlled by the first clock gating enable signal CGE1, the first clock gating domain CGD1 received the clock Clk by the first clock gating cell CG1, the second clock gating cell CG2 controlled by the second clock gating enable signal CGE2, the second clock gating domain CGD2 received the clock Clk by the second clock gating cell CG2, the third clock gating cell CG2 controlled by the third clock gating enable signal CGE3, the third clock gating domain CGD3 received the clock Clk by the third clock gating cell CG3, the fourth clock gating cell CG4 controlled by the fourth clock gating enable signal CGE4 and the fourth clock gating domain CGD4 received the clock Clk by the fourth clock gating cell CG4.

Among them, the first clock gating domain CGD1 to the third clock gating domain CGD3 may not include a memory, and accordingly, power consumption CP1 to CP3 consumed by the first clock gating domain CGD1 to the third clock gating domain CGD3 may be calculated by the method described above with reference to FIGS. 1 to 3, a description thereof will be omitted.

Since the fourth clock gating domain CGD4 may include the memory Mem, the weight may be determined based on the operating state of the memory Mem. In one embodiment, the fourth weight Wt4 corresponding to the fourth clock gating domain CGD4 may be determined based on various signal combinations applied to the memory Mem, and in one example, it may be determined based on the write enable signal Wen a chip enable signal Cen. In the present specification, the fourth weight Wt4 determined by the chip enable signal Cen and the write enable signal Wen may be expressed as 'Wt4 (Cen, Wen)'.

The method for modeling power consumption according to an embodiment of the present disclosure may calculate power consumption based on the operating state of the memory Mem for the clock gating domain including the memory Mem, and accordingly, the power consumption for the integrated circuit IC2 can be modeled by reflecting the power consumption that is different for each operating state.

The power consumption CP4 for the fourth clock gating domain is to be calculated as "CP4=Wt4(Cen, Wen)*CGE3*CGE4" by considering the hierarchy structure and the memory operation state at the same time as mentioned in FIGS. 1 to 3.

Accordingly, power consumption CP for the integrated circuit IC2 may be calculated as in Equation 2 below with respect to the third weight Wt3 of the third clock gating domain CGD3. (C2 is a constant value due to leakage power, etc.)

$$CP=CP1+CP2+CP3+CP4+C2=Wt1*CGE1+\\Wt2*CGE1*CGE2+Wt3*CGE3+\\Wt4(Cen,Wen)*CGE3*CGE4+C2 \quad \text{[Equation 2]}$$

Figure 6:
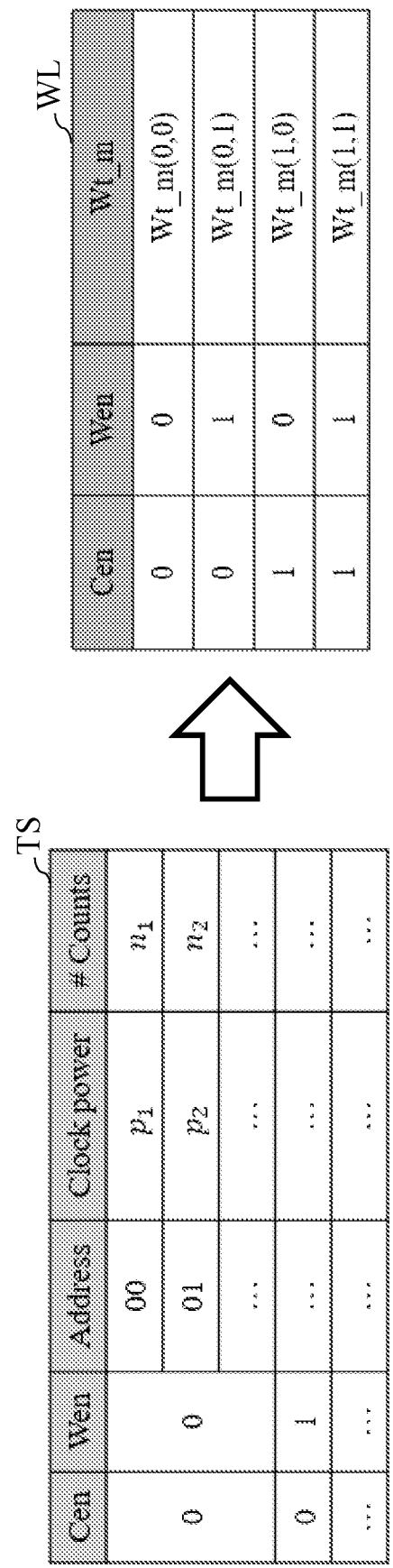
FIG. 6 is a flowchart illustrating a method of determining a weight according to a memory operation state according to an exemplary embodiment of the present disclosure.

FIG. 6 is a flowchart illustrating a method of determining a weight according to a memory operation state according to an exemplary embodiment of the present disclosure. In detail, FIG. 6 illustrates a method of generating a weight look up table WL used to determine a weight and determining a weight according to a memory operation state using the generated weight.

According to FIGS. 5 and 6, the power consumption modeling system may determine the weight based on a weight look up table WL composed of a combination of input signals of a memory. In one example, the weight look up table WL may include information on weight Wt_m for each combination of control signals Cen, Wen.

In an embodiment, the weight Wt_m for each combination of the control signal may be determined through a simulation result. In one example, clock power consumption Clock power and the number of accesses # Counts may be obtained for each combination of an address and a control signal through simulation. In an example in which the chip enable signal Cen has a logic low '0' and the write enable signal Wen has a logic low '0', the first power p1 is consumed when the address is '00', and the address can be accessed the first number of times n1. In this way, in the example of the combination of the control signal, clock power consumption Clock power corresponding to all addresses and the number of accesses # Counts for each address can be obtained, and the weight for each combination of the control signal Wt_m(0,0) may be obtained through Equation 3 below.

$$Wt\_m(0,0) = \frac{\sum_{i=0}^{N} n_i \times p_i}{\sum_{i=0}^{N} n_i} \quad \text{[Equation 3]}$$

In a similar way, weights Wt_m(0,1), Wt_m(1,0), Wt_m (1,1) for each combination of control signals are obtained for all cases of the chip enable signal Cen and the write enable signal Wen. And, accordingly, a weight look up table WL may be generated.

According to an embodiment of the present disclosure, the weight for each combination of the control signal is obtained from the weight look up table WL generated as a result of the simulation, and the power consumption for the memory may be calculated using the obtained weight, thereby providing an accurate power consumption modeling is possible.

FIG. 6 illustrates an example of calculating power consumption based on a chip enable signal Cen and a write enable signal Wen as a control signal, but the technical concept of the present disclosure is not limited thereto, and various signals (eg, an address signal, a data signal, etc.) may be applied for calculating power consumption.

Figure 7:
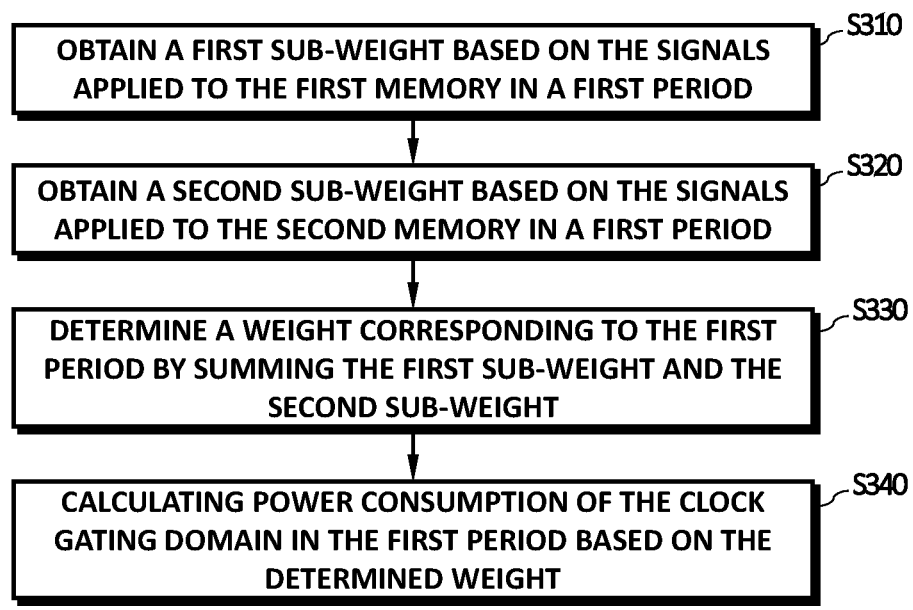
FIG. 7 is a flowchart illustrating a method for modeling power consumption for an integrated circuit according to an exemplary embodiment of the present disclosure.

FIG. 7 is a flowchart illustrating a method for modeling power consumption for an integrated circuit according to an exemplary embodiment of the present disclosure. In detail, FIG. 7 shows a method of calculating power consumption of a clock gating domain including a plurality of memories.

According to FIG. 7, the power consumption modeling system may obtain a first sub-weight based on the combination of the control signal applied to the first memory in the first clock cycle S310. The power consumption modeling system may acquire the second sub-weight based on the combination of the control signal applied to the second memory in the first clock cycle S320. Each of the first sub-weight and the second sub-weight may be a weight corresponding to the first memory or the second memory and may be obtained through a weight look up table as described above with reference to FIG. 6.

The power consumption modeling system may determine a weight corresponding to the first clock cycle by summing the acquired first sub-weight and the second sub-weight S330. The power consumption modeling system may calculate the power consumption of the clock gating domain including the first memory and the second memory in the first clock cycle based on the determined weight S340.

Figure 8:
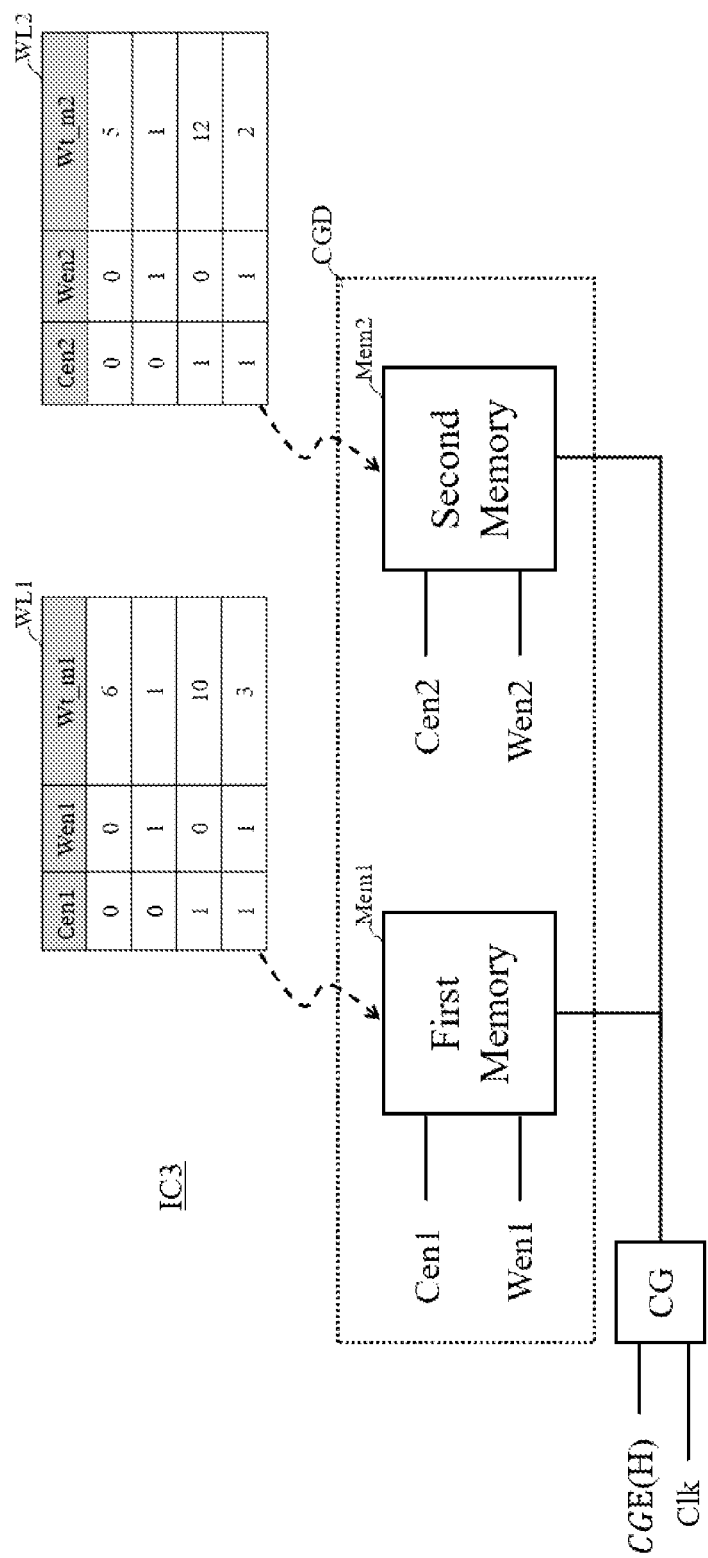
FIG. 8 is a circuit diagram illustrating a method for modeling power consumption for an integrated circuit according to an exemplary embodiment of the present disclosure.
Figure 9:
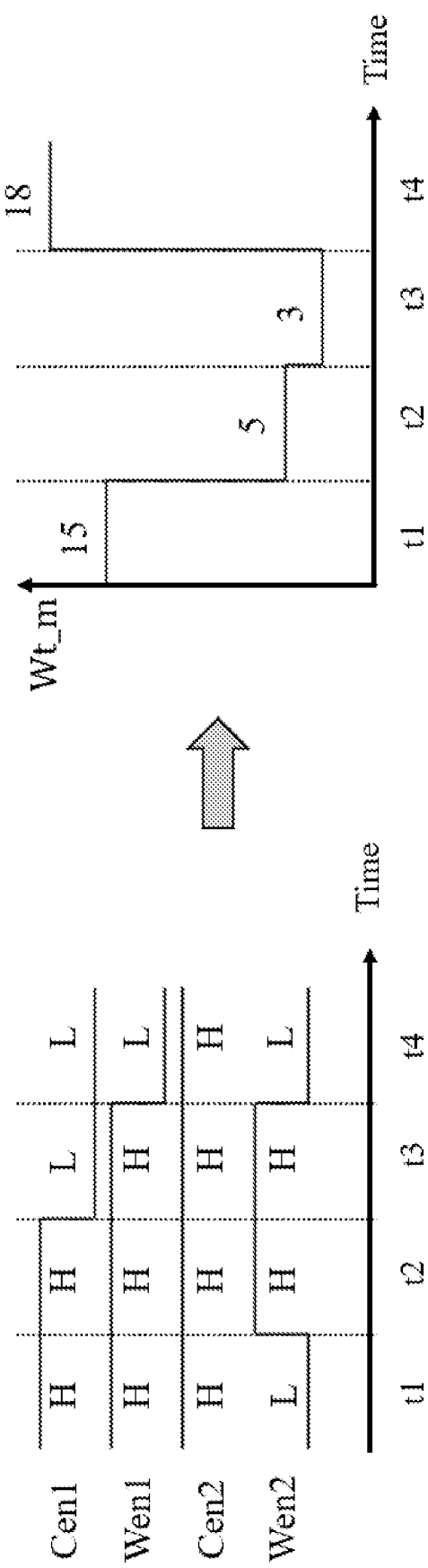
FIG. 9 is a figure illustrating a method for modeling power consumption for an integrated circuit according to an exemplary embodiment of the present disclosure.

FIG. 8 is a circuit diagram illustrating a method for modeling power consumption for an integrated circuit according to an exemplary embodiment of the present disclosure and FIG. 9 is a figure illustrating a method for modeling power consumption for an integrated circuit according to an exemplary embodiment of the present disclosure. In detail, FIGS. 8 and 9 show a method of calculating power consumption for a clock gating domain CGD including a plurality of memories Mem1 and Mem2.

According to FIG. 8, the integrated circuit IC3 may comprise a clock gating cell CG controlled by a clock gating enable signal CGE, a first memory Mem1 controlled by a first chip enable signal Cen1 and a first write enable signal Wen1 and a second memory Mem2 controlled by a second chip enable signal Cen2 and a second write enable signal Wen2.

The power consumption of the integrated circuit IC3 may be determined based on a first sub-weight Wt_m1 corresponding to the first memory Mem1 and a second sub-weight Wt_m2 corresponding to the second memory Mem2. As mentioned in FIGS. 1 to 8, the power consumption CP of the integrated circuit IC3 is "CP={Wt$_{m1(Cen1,Wen1)}$+ Wt$_{m2(Cen2,Wen2)}$}*CGE+C3" (C3 is a constant value due to leakage power, etc.), and each sub-weight may be obtained based on the weight look up tables WL1, WL2. The first weight look up table WL1 may correspond to the first memory Mem1 and the second weight look up table WL2 may correspond to the second memory Mem2.

According to FIG. 9, the signal value of the first chip enable signal Cen1, the first write enable signal Wen1, the second chip enable signal Cen2 and the second write enable signal Wen2 from the first clock cycle t1 to the fourth clock cycle t4 may be shown. In the first clock cycle t1, the first chip enable signal Cen1 may be logic high H, the first write enable signal Wen1 may be logic high H, and the second chip enable signal Cen2 may be logic high H and the second write enable signal Wen2 may be a logic low L.

According to the first weight look up table WL1 of FIG. 8, when the first chip enable signal Cen1 is logic high H and the first write enable signal Wen1 is logic high H, the first sub-weight Wt_m1 may have '3'. According to the second weight look up table WL2, when the third chip enable signal Cen3 is logic high H and the second write enable signal Wen2 is logic low L, the second sub-weight Wt_m2 may have '12'. Accordingly, in the first clock cycle t1, the weight Wt_m corresponding to the clock gating domain CGD may be determined to be '15', which is the sum of the first sub-weight Wt_m1 and the second sub-weight Wt_m2. In a similar manner, the weight Wt_m for the second clock cycle t2 is determined as '5', the weight Wt_m for the third clock cycle t3 is determined as '3', and the weight Wt_m for the fourth clock cycle t4 is determined as '18'.

In one example, the power consumption during the clock cycle t1 to t4 of the integrated circuit IC3 may be determined as '41' which is the sum of the weights Wt_m for the first clock cycle t1 to the fourth clock cycle t4 when the clock gating enable signal CGE is logic high H.

According to an embodiment of the present disclosure, even when the operation states of a plurality of memories are different, a weight can be determined by summing the sub-weights for each memory, and power consumption may be modeled using this, and thus accurate power consumption may be modeled.

In the examples of FIGS. 8 and 9, an example in which two memories are included in the clock gating domain CGD is shown, but this is only an example, and the technical idea of the disclosure may also be applied to an example in which more than three memories are included in the clock gating domain CGD.

In addition, in the embodiment in which other elements are included in addition to the memory, power consumption may be calculated by adding the weight having a fixed value as described above in the embodiments of FIGS. 1 to 3 and the weight having a variable based on the input signal of the memory as described above in the embodiments of FIG. 6.

Figure 10:
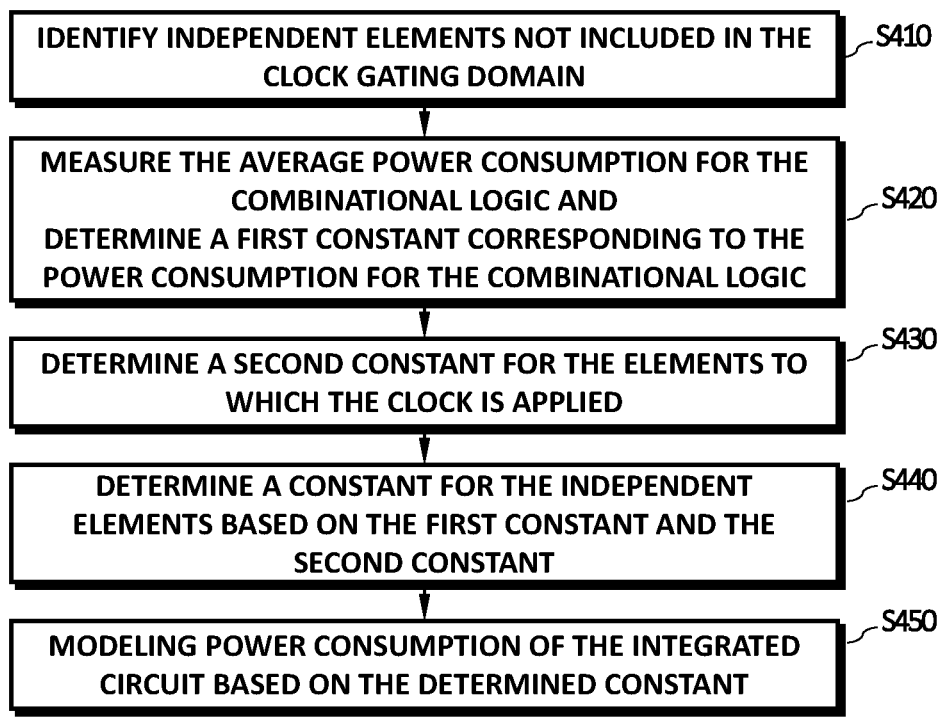
FIG. 10 is a flowchart illustrating a method for modeling power consumption for an integrated circuit according to an exemplary embodiment of the present disclosure.

FIG. 10 is a flowchart illustrating a method for modeling power consumption for an integrated circuit according to an exemplary embodiment of the present disclosure.

The power consumption modeling system may identify independent elements that are not included in the clock gating domain S410. The independent element may mean an element to which a clock is applied without passing through a clock gating cell or an element to which a clock is not applied in the entire circuit. The independent element may include a clock logic to which a clock is applied without going through a clock gating cell, a combinational logic to which a clock is not applied in the entire circuit, and memories to which a clock is applied without going through a clock gating cell.

The power consumption modeling system may measure the average power consumption for the combinational logic and determine a first constant for the measured average power consumption S420. The first constant may correspond to the power consumption of the combinational logic.

The power consumption modeling system may determine a second constant for power consumption of an element to which a clock is applied (eg, a memory to which a clock is applied without going through a clock logic and/or a clock gating cell) S430. The second constant may be a value corresponding to power consumed by applying the clock to the element to which the clock is applied. The power consumption modeling system may determine a constant for the independent elements based on the first constant and the second constant S440.

Also, although not shown, the power consumption modeling system may determine a constant for each combination of input signals to the memory for memories included in the independent elements and use the determined constant to model power consumption. In one embodiment, the power consumption modeling system may determine the constant for the memory included in the independent elements in a method similar to the weight determination method described above with reference to FIG. 6.

The power consumption modeling system can model the power consumption for the integrated circuit based on the constant for the independent elements S450.

In this specification, constant may mean a constant value used when calculating power consumption for an integrated circuit regardless of the logic level of the clock gating enable signal. In one example, the power consumption modeling system may calculate the power consumption corresponding to the clock gating domains through the method described above in FIGS. 1 to 9, and add the constant determined by S440 to the calculated value for the integrated circuit.

Figure 11:
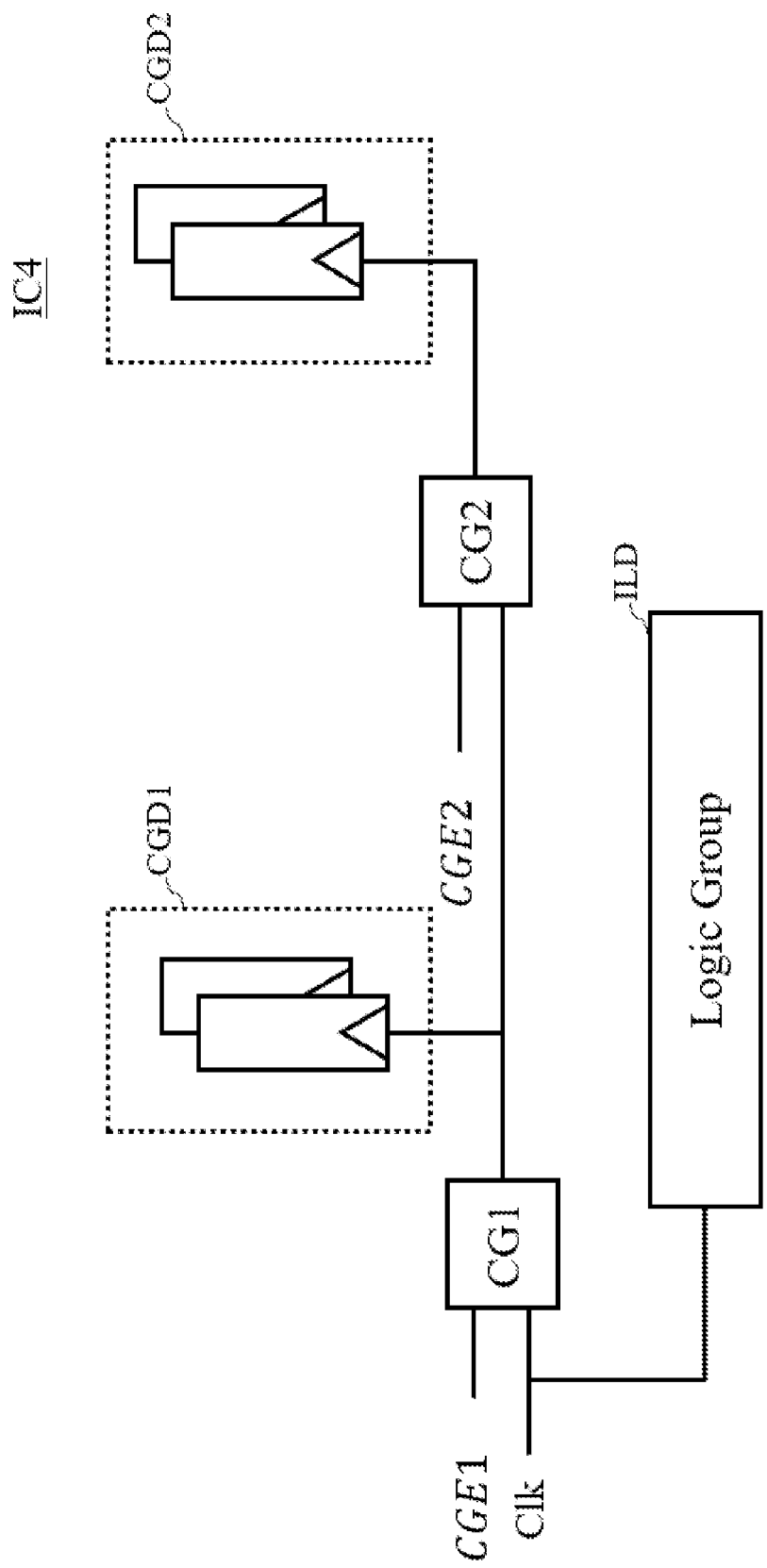
FIG. 11 is a circuit diagram illustrating an integrated circuit according to an exemplary embodiment of the present disclosure.

FIG. 11 is a circuit diagram illustrating an integrated circuit according to an exemplary embodiment of the present disclosure.

According to FIG. 11, the integrated circuit IC4 may comprise the first clock gating cell CG1 controlled by the first clock gating enable signal CGE1, the first clock gating domain CGD1 received the clock Clk by the first clock gating cell CG1, the second clock gating cell CG2 controlled by the second clock gating enable signal CGE2, the second clock gating domain CGD2 received the clock Clk by the second clock gating cell CG2 and the independent elements ILD. The independent element ILD may include elements to which a clock is applied without going through a separate clock gating cell, elements or memory to which a clock is not applied in the entire circuit.

The power consumption modeling system may measure the average power consumption for combinational logic that is not applied with a clock among independent elements ILD. In addition, the power consumption modeling system may determine a first constant for the combinational logic based on the measured average power consumption, and determine a constant Cst value for the independent elements ILD based on the first constant and the second constant for the element to which the clock are applied.

Based on Equation 1 in FIG. 3 and the basic weight, the power consumption for the integrated circuit IC4 may be modeled by Equation 4 below with respect to the power consumption CP1 of the independent elements ILD. (C4 is a constant value due to leakage power, etc.)

$$CP=CP1+CP2+CP1+C4=Wt1*CGE1+Wt2*CGE1*CGE2+Cst+C4 \quad \text{[Equation 4]}$$

Figure 12:
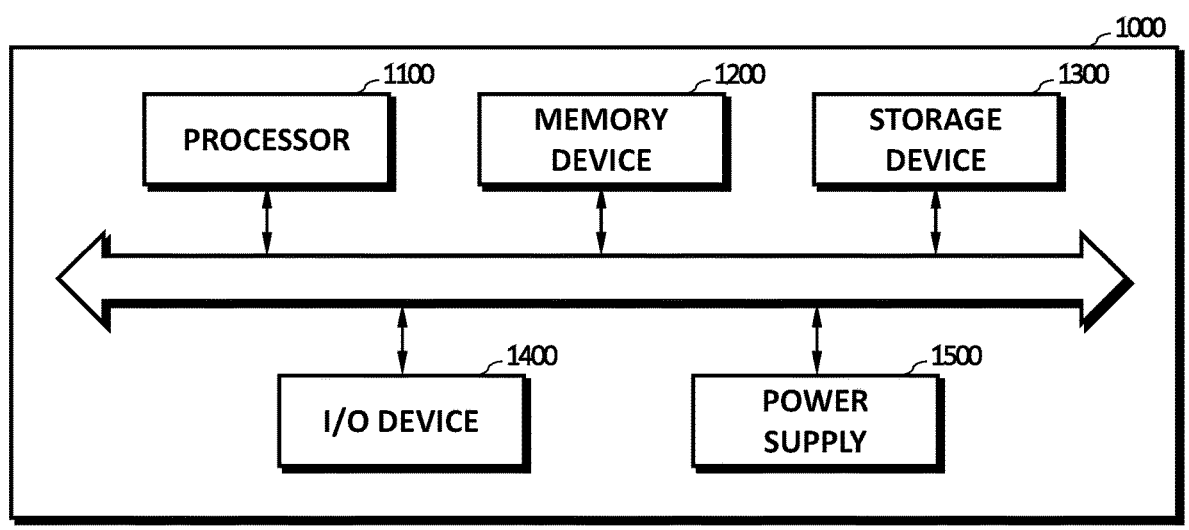
FIG. 12 is a block diagram illustrating a power consumption modeling system according to an embodiment of the present disclosure.

FIG. 12 is a block diagram illustrating a power consumption modeling system according to an embodiment of the present disclosure.

FIG. 12 is a block diagram illustrating a computing system including an integrated circuit design system according to an embodiment of the present disclosure.

According to FIG. 12, the computing system 1000 may include a processor 1100, a memory device 1200, a storage device 1300, a power supply 1400, and an input/output device 1500. Meanwhile, although not shown in FIG. 12, the computing system 1000 may further include ports capable of communicating with a video card, a sound card, a memory card, a USB device, or the like, or communicating with other electronic devices.

As such, the processor 1100, the memory device 1200, the storage device 1300, the power supply 1400 and the input/output device 1500 included in the computing system 1000 are provided according to the technical idea of the present disclosure. It may include an integrated circuit designed by an integrated circuit design system or an integrated circuit design system according to embodiments. Specifically, in at least one of the processor 1100, the memory device 1200, the storage device 1300, the power supply 1400, and the input/output device 1500 or the semiconductor device may perform the simulation predicting information described above with reference to FIGS. 1 to 11.

In another example, the processor 1100 controls the memory device 1200, the storage device 1300, the power supply 1400 and the input/output device 1500, thereby controlling the method for modeling the power consumption of an integrated circuit as described in FIGS. 1 to 11.

The processor 1100 may perform certain calculations or tasks. According to an embodiment, the processor 1100 may be a micro-processor (micro-processor) or a central processing unit (CPU). The processor 1100 may communicate with the memory device 1200, the storage device 1300 and the input/output device 1500 by using the bus 1600. According to an embodiment, the processor 1100 may also be connected to an expansion bus such as a Peripheral Component Interconnect (PCI) bus.

The memory device 1200 may store data necessary for the operation of the computing system 1000. For example, the memory device 1200 may be implemented as DRAM, mobile DRAM, SRAM, PRAM, FRAM, RRAM, and/or MRAM. there is. The storage device 1300 may include a solid-state drive, a hard disk drive, a CD-ROM, and the like. The memory device 1200 and the storage device 1300 may store the program related to the method for modeling the power consumption of an integrated circuit described above with reference to FIGS. 1 to 11.

The input/output device 1500 may include input means such as a keyboard, a keypad, and a mouse, and output means such as a printer and a display. The input/output device 1500 may receive a specification of a designed circuit required for the method for designing an integrated circuit described above with reference to FIGS. 1 to 11 and display a design model generated by the method for designing an integrated circuit. The power supply 1400 may supply an operating voltage required for the operation of the computing system 1000.

The integrated circuit designed according to the above-described embodiments of the present disclosure may be implemented in various types of packages. For example, configurations of at least some of the integrated circuits include Package on Package (PoP), Ball grid arrays (BGAs), Chip scale packages (CSPs), Plastic Leaded Chip Carrier (PLCC), and Plastic Dual In-Line Package (PDIP)., Die in Waffle Pack, Die in Wafer Form, Chip On Board(COB), Ceramic Dual In-Line Package(CERDIP), Plastic Metric Quad Flat Pack(MQFP), Thin Quad Flatpack(TQFP), Small Outline(SOIC), Shrink Small Outline Package(SSOP), Thin Small Outline(TSOP), Thin Quad Flatpack(TQFP), System In Package(SIP), Multi Chip Package(MCP), Wafer-level Fabricated Package(WFP), Wafer-Level Processed Stack It may be mounted using packages such as Package (WSP).

Exemplary embodiments have been disclosed in the drawings and specification as described above. Although the embodiments have been described using specific terms in the present specification, these are used only for the purpose of explaining the technical idea of the present disclosure, and not used to limit the meaning or the scope of the present disclosure described in the claims. Therefore, it will be understood by those skilled in the art that various modifications and equivalent other embodiments are possible therefrom. Accordingly, the true technical protection scope of the present disclosure should be defined by the technical idea of the appended claims.

What is claimed is:

1. A method for modeling power consumption for an integrated circuit, performed by a power consumption modeling system including a processor based on a computer program including at least one instruction, the method comprising:
 determining, by the processor, a hierarchy structure regarding a gating level according to a clock flow of a plurality of clock gating cells included in the integrated circuit;
 determining, by the processor, a first clock gating domain corresponding to a first clock gating cell and a second clock gating domain corresponding to a second clock gating cell located in a lower level of the hierarchy of the first clock gating cell based on the hierarchy structure;
 receiving, by the processor, a first clock gating enable signal applied to the first clock gating cell;
 calculating, by the processor, power consumption of the second clock gating domain based on a first logic level of the first clock gating enable signal;
 modeling, by the processor, power consumption of the integrated circuit based on the power consumption of the second clock gating domain;
 generating, by the processor, a power consumption modeling circuit using the modeled power consumption of the integrated circuit;
 implementing, by the processor, the power consumption modeling circuit into hardware implementation; and
 using, by the processor, the power consumption modeling circuit to optimize the power consumption of the integrated circuit,
 wherein the calculating power consumption of the second clock gating domain comprises:
 determining, by the processor, whether a memory is included in a third clock gating domain corresponding to a third clock gating cell;
 determining, by the processor, a third weight corresponding to the third clock gating domain based on the operating state of the memory if the memory is included in the third clock gating domain; and
 calculating, by the processor, power consumption for the third clock gating domain based on the third weight and a third logic level of a third clock gating enable signal applied to the third clock gating cell,
 wherein the determining the third weight corresponding to the third clock gating domain comprises:
 obtaining, by the processor, information of at least one signal applied to the memory; and determining, by the processor, the third weight corresponding to the at least one signal based on a weight look up table,
wherein the third clock gating domain includes a first memory and a second memory,
and wherein the calculating power consumption for the third clock gating domain comprises:
obtaining, by the processor, a first sub-weight from the weight look up table based on a combination of first signals applied to the first memory in a first clock cycle;
obtaining, by the processor, a second sub-weight from the weight look up table based on a combination of second signals applied to the second memory in the first clock cycle;
calculating, by the processor, the third weight corresponding to the third clock gating domain of the first clock cycle by summing the first sub-weight and the second sub-weight;
calculating, by the processor, power consumption corresponding to the third clock gating domain of the first clock cycle based on the third weight;
obtaining, by the processor, a third sub-weight from the weight look up table based on a combination of third signals applied to the first memory in a second clock cycle;
obtaining, by the processor, a fourth sub-weight from the weight look up table based on a combination of fourth signals applied to the second memory in the second clock cycle;
calculating, by the processor, a fourth weight corresponding to the third clock gating domain of the second clock cycle by summing the third sub-weight and the fourth sub-weight; and
calculating, by the processor, power consumption corresponding to the third clock gating domain of the second clock cycle based on the fourth weight.

2. The method of claim 1, wherein the calculating power consumption of the second clock gating domain comprises:
determining, by the processor, the first logic level of the first clock gating enable signal and a second logic level of a second clock gating enable signal applied to the second clock gating cell; and
calculating, by the processor, power consumption of the second clock gating domain by multiplying the first logic level, the second logic level, and a second weight corresponding to the second clock gating domain.

3. The method of claim 1, wherein the calculating power consumption of the second clock gating domain comprises:
calculating, by the processor, power consumption of the first clock gating domain by multiplying the first logic level and a first weight corresponding to the first clock gating domain;
and wherein the modeling power consumption of the integrated circuit comprises:
modeling, by the processor, power consumption of the integrated circuit based on the modeling, by the processor, power consumption of the integrated circuit based on the power consumption of the first clock gating domain and power consumption of the second clock gating domain.

4. The method of claim 1, wherein the at least one signal applied to the memory includes a chip enable signal and a write enable signal, and
wherein the weight look up table includes information on weights for each combination of the chip enable signal and the write enable signal.

5. The method of claim 1, further comprising:
identifying, by the processor, the independent elements not included in any of clock gating domains of the plurality of clock gating cells;
measuring, by the processor, power consumption for a combinational logic among the independent elements;
determining, by the processor, a first constant corresponding to the power consumption for the combinational logic;
determining, by the processor, a second constant for at least one clock logic to which the clock is applied among the independent elements; and
modeling, by the processor, power consumption of the integrated circuit based on the first constant and the second constant.

6. A method for modeling power consumption for an integrated circuit, performed by a power consumption modeling system including a processor based on a computer program including at least one instruction, the method comprising:
determining, by the processor, whether a memory is included in a clock gating domain corresponding to a clock gating cell;
determining, by the processor, a first weight corresponding to the clock gating domain based on the operating state of the memory if the memory is included in the clock gating domain;
receiving, by the processor, a clock gating enable signal applied to the clock gating cell;
calculating, by the processor, power consumption for the clock gating domain based on the first weight and a first logic level of the clock gating enable signal;
generating, by the processor, a power consumption modeling circuit using the calculated power consumption of the clock gating domain;
implementing, by the processor, the power consumption modeling circuit into hardware implementation; and
using, by the processor, the power consumption modeling circuit to optimize the power consumption of the integrated circuit,
wherein the determining the first weight corresponding to the clock gating domain comprises:
obtaining, by the processor, information of at least one signal applied to the memory; and
determining, by the processor, the first weight corresponding to the at least one signal based on a weight look up table,
wherein the clock gating domain includes a first memory and a second memory, and
wherein the calculating power consumption for the clock gating domain comprises:
obtaining, by the processor, a first sub-weight from the weight look up table based on a combination of first signals applied to the first memory in a first clock cycle;
obtaining, by the processor, a second sub-weight from the weight look up table based on a combination of second signals applied to the second memory in the first clock cycle;
calculating, by the processor, the first weight corresponding to the clock gating domain of the first clock cycle by summing the first sub-weight and the second sub-weight;
calculating, by the processor, power consumption corresponding to the clock gating domain of the first clock cycle based on the first weight;

obtaining, by the processor, a third sub-weight from the weight look up table based on a combination of third signals applied to the first memory in a second clock cycle;

obtaining, by the processor, a fourth sub-weight from the weight look up table based on a combination of fourth signals applied to the second memory in the second clock cycle;

calculating, by the processor, a second weight corresponding to the clock gating domain of the second clock cycle by summing the third sub-weight and the fourth sub-weight; and calculating, by the processor, power consumption corresponding to the clock gating domain of the second clock cycle based on the second weight.

7. The method of claim 6, wherein the at least one signal applied to the memory includes a chip enable signal and a write enable signal, and wherein the weight look up table includes information on weights for each combination of the chip enable signal and the write enable signal.

\* \* \* \* \*